F. C. BILLINGS.
SAFETY LATHE DOG.
APPLICATION FILED JULY 10, 1912.

1,044,856.

Patented Nov. 19, 1912.

WITNESSES
M. E. O'Neill
M. A. Shuckerow

INVENTOR
Frederic C. Billings

BY
ATTORNEY

UNITED STATES PATENT OFFICE.

FREDERIC C. BILLINGS, OF HARTFORD, CONNECTICUT, ASSIGNOR TO THE BILLINGS & SPENCER COMPANY, OF HARTFORD, CONNECTICUT, A CORPORATION OF CONNECTICUT.

SAFETY LATHE-DOG.

1,044,856.   Specification of Letters Patent.   Patented Nov. 19, 1912.

Application filed July 10, 1912. Serial No. 708,580.

*To all whom it may concern:*

Be it known that I, FREDERIC C. BILLINGS, a citizen of the United States, and a resident of Hartford, in the county of Hartford and State of Connecticut, have invented certain new and useful Improvements in Safety Lathe-Dogs, of which the following is a specification.

The object of this invention is to produce a guard for the set screw usually employed in the lathe dogs and like articles, to eliminate the liability of accident which is apt to be occasioned by catching the clothing of the workmen in the unguarded set screw.

Figure 1:
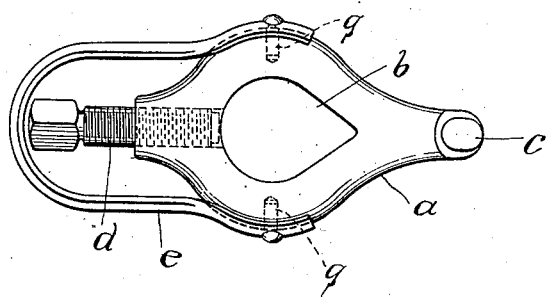
Figure 2:
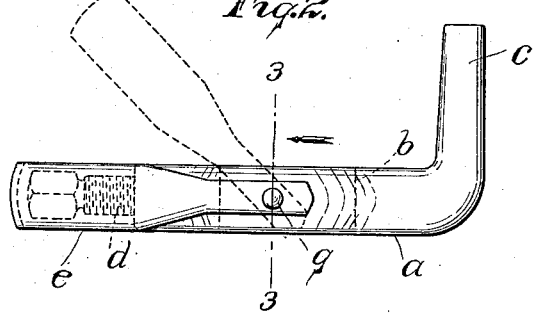
Figure 3:
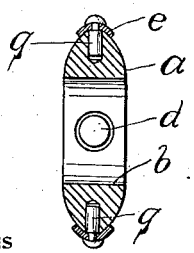
Figure 4:
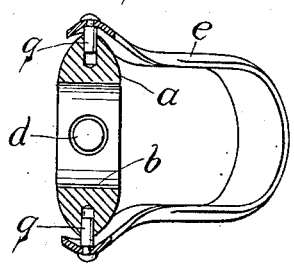

In the drawings: Figure 1 denotes a front view of a lathe dog embodying my invention. Fig. 2 is a side view thereof. Fig. 3 is a sectional view thereof on the line 3—3 of Fig. 2. Fig. 4 is a view similar to Fig. 3 showing the result from moving the guard out of position.

Referring to the drawings $a$ denotes the lathe dog centrally apertured as at $b$ to receive the work and having a driving tail $c$ to engage with the chuck. $d$ is a set screw which fastens the work in the dog, $e$ is the guard formed from sheet metal of a general U-shape its ends pivotally attached to the sides of the dog as by the pins $g$—$g$ and upon which the guard can be thrown to the position shown in dotted lines in Fig. 2 so as to give access to the head of the set screw in order that it may be operated by a suitable wrench. The cross-sectional shape of the guard as clearly seen in Figs 3 and 4 conforms rather closely to the contour of that part of the dog to which the ends are attached and the guard is of resilient material so that when it is in its normal position its ends closely hug the dog. Owing to this construction the guard is held in its normal position and when it is to be thrown out of position the ends of the guard must be disengaged from the sides or edges of the dog. To permit of this it is the preferred construction to secure the pivot pin in the ends of the guard with its head substantially flush and allow it a slight longitudinal movement in the sockets in the dog.

I do not wish to be understood as limiting myself to the exact shape of guard shown or to the exact point of its attachment to the dog and obviously the invention is applicable to various forms and sizes of dogs. Furthermore, it will be observed that the guard can be readily applied to any dog either by merely drilling sockets in the top to receive the pins, or the pins can be omitted and the guard sprung onto the dog, the cross sectional shape of the guard and dog preventing displacement in one direction and the ends extending beyond the greatest diameter of the dog holding the guard from endwise displacement.

I claim as my invention:

1. The combination with a lathe dog and its set screw of a guard for the latter comprising a substantially U-shaped member having at least one end pivotally secured to the dog.

2. The combination with a lathe dog and its set screw, of a guard for the latter comprising a substantially U-shaped member with its ends pivotally attached to the dog, and means for holding said guard in normal position.

3. The combination with a lathe dog and its set screw, of a guard for the latter comprising a substantially U-shaped member with its ends pivotally attached to the dog, and yielding means for holding said guard in normal position.

4. The combination with a dog and its set screw, of a guard for the latter comprising a substantially U-shaped member having a pivot pin at one of its ends adapted to fit in a socket in the dog and longitudinally movable therein.

5. The combination with a dog and its set screw, of a guard for the latter comprising a substantially U-shaped member having its ends pivotally secured to the dog, the cross sectional shape of the ends of said guard conforming to the contour of that part of the dog to which they are attached and forming an interlocking engagement therewith.

6. The combination with a dog and its set screw, of a guard for the latter comprising a substantially U-shaped member having its ends pivotally secured to the dog, the cross sectional shape of the ends of said guard conforming to the contour of that part of the dog to which they are attached and forming a yielding interlocking engagement therewith.

7. The combination with a dog and a set screw, of a guard for the latter comprising a substantially U-shaped member, pivot pins secured to the ends of said guard and adapted to fit into sockets in the dog, the cross sectional shape of the ends of said guard corresponding to the contour of that part of the dog to which they are attached and providing interlocking engagement, said pivot pins being movable rotatably and longitudinally in the sockets in the dog.

8. A guard for lathe dog set screws, formed from a strip of spring metal, bent to substantial U-shape, the ends of the arms being longitudinally grooved and curved to approximately the same shape as the surface of that part of the dog to which the guard is to be attached.

FREDERIC C. BILLINGS.

Witnesses:
LINN D. PARKER,
F. C. BLAND.

Copies of this patent may be obtained for five cents each, by addressing the "Commissioner of Patents, Washington, D. C."